United States Patent [19]
Enders et al.

[11] Patent Number: 5,845,935
[45] Date of Patent: Dec. 8, 1998

[54] SIDE AIRBAG MODULE

[75] Inventors: Mark L. Enders, Ogden, Utah; Davin G. Saderholm, Bietigheim-Bissingen, Germany

[73] Assignee: Morton International, Inc., Chicago, Ill.

[21] Appl. No.: 813,648

[22] Filed: Mar. 7, 1997

[51] Int. Cl.⁶ .................................................. B60R 21/20
[52] U.S. Cl. .................................... 280/743.2; 280/730.2; 280/730.1
[58] Field of Search .............................. 280/730.1, 730.2, 280/743.2

[56] References Cited

U.S. PATENT DOCUMENTS

| | | | |
|---|---|---|---|
| 3,510,150 | 5/1970 | Wilfert | 280/733 |
| 3,897,961 | 8/1975 | Leising et al. | 280/730.1 |
| 4,262,931 | 4/1981 | Strasser et al. | 280/730.1 |
| 5,222,761 | 6/1993 | Kaji et al. | 280/730.2 |
| 5,273,309 | 12/1993 | Lau et al. | 280/730.2 |
| 5,382,051 | 1/1995 | Glance | 280/751 |
| 5,464,250 | 11/1995 | Sato | 280/743.2 |
| 5,788,270 | 8/1998 | HÅland et al. | 280/730.2 |

FOREIGN PATENT DOCUMENTS 3-258636  11/1991  Japan.
3-276844  12/1991  Japan.
5-038993  2/1993   Japan.

*Primary Examiner*—Kenneth R. Rice
*Attorney, Agent, or Firm*—George W. Rauchfuss, Jr.

[57] ABSTRACT

An airbag module including an inflator assembly and an airbag cushion. The inflator assembly has an inflator and at least one fastener for mounting the airbag module within a vehicle. The airbag cushion includes an inboard cushion sheet and an outboard cushion sheet having an outer periphery secured to an outer periphery of the inboard cushion sheet. The outboard cushion sheet defines an open mouth receiving the inflator assembly, and a first tether and a second tether extend between the outboard cushion sheet and the inboard cushion sheet on opposite sides of the open mouth. The first tether and the second tether divide the airbag cushion into a first airbag segment for cushioning a first seat occupant of a vehicle, a central segment containing the inflator assembly, and a second airbag segment for cushioning a second occupant of a vehicle seat occupant, and each of the first and second tethers define at least one inflation gas passage. Baffle flaps located adjacent the inflation gas passages defined by the tethers allow inflation gas to enter the first and second airbag segments from the central segment yet prevent inflation gas from exiting the first and second airbag segments through the inflation gas passages.

25 Claims, 5 Drawing Sheets

SIDE AIRBAG MODULE

FIELD OF THE INVENTION

The present invention relates to an airbag module and, more particularly, to an airbag module for protecting two occupants of a vehicle with a single airbag, and even more particularly, to a side airbag module suitable for protecting both front and rear seat occupants of a vehicle with a single airbag.

BACKGROUND OF THE INVENTION

An airbag module is part of an inflatable restraint system employed in a vehicle, especially in an automobile, for protecting an occupant against injury. The module deploys an inflated airbag cushion to physically restrain the occupant's body when the vehicle encounters a collision. The airbag module normally includes an inflatable airbag cushion and an inflator that, once triggered by a remote collision sensor, provides inflation gas for inflating the airbag cushion.

As its name implies, a side airbag module protects an occupant against an impact to the side of the vehicle and is normally positioned somewhere between the occupant and the side of the vehicle closest to the occupant. One option for a side airbag module mounting location which has proven advantageous is in the center or "B" pillar of the auto. This location is advantageous because the airbag module is ideally positioned with respect to a front and a rear passenger. In addition, the center pillar is relatively spacious and provides easy access for the airbag module control wiring.

In order to reduce weight and costs, providing a side airbag module that provides protection for both a front and a rear vehicle occupant would be generally preferable over having to provide a separate side airbag module for each occupant. Providing a single side airbag module for protecting both a front and a rear vehicle occupant, however, would generally mean having a single inflator and a relatively large airbag cushion having a front segment for the front occupant and a rear segment for the rear occupant.

One problem with providing a large side airbag cushion is, that upon inflation, the airbag cushion may tend to deploy inwardly towards the occupants and strike the occupants before being fully inflated, instead of preferably deploying against and along the side of the interior of the vehicle and being correctly positioned and fully inflated before the occupants strike the airbag cushion. Such a large side airbag cushion would therefore have to include means for preventing the airbag cushion from being deployed inwardly towards the occupants upon inflation.

Another problem with providing a large side airbag cushion is that inflation gas within the fully inflated airbag cushion may be squeezed or transferred from the front segment to the rear segment, or vice versa, if only one occupant strikes the airbag cushion or if the front and rear occupants strike the airbag cushion at different times. Inflation gas permitted to be squeezed out of a segment of the inflated airbag cushion would cause that segment to collapse and not provide the desired protection to an occupant. Such a large side airbag cushion would therefore have to include means for preventing inflation gas from being squeezed or transferred out of the front and rear segments during or after inflation of the airbag cushion.

SUMMARY OF THE INVENTION

A general object, therefore, of the present invention is to provide a new and improved airbag module.

A more particular object of the present invention is to provide an airbag module that will simultaneously protect two occupants of a vehicle, especially an airbag module that will simultaneously provide protection for both a front and a rear occupant.

Another object of the present invention is to provide an airbag cushion for use with a side airbag module mounted in a central pillar of a vehicle that deploys longitudinally along the side of the vehicle interior and not significantly inwardly towards the occupants.

An additional object of the present invention is to provide an airbag cushion having a first segment for a first occupant of a vehicle and a second segment for a second occupant of a vehicle, and more particularly having a front segment for a front passenger and a rear segment for a rear passenger.

A further object of the present invention is to provide such an airbag cushion having means for preventing inflation gas from being squeezed between the two segments, or between the front and rear segments.

In carrying out this invention, there is provided an airbag cushion for use with a side airbag module including an inflator. The airbag cushion includes a generally elongated first or outboard cushion sheet generally centrally defining an open mouth for receiving inflation gas from the inflator, and a generally elongated second or inboard cushion sheet having an outer periphery secured to an outer periphery of the outboard cushion sheet. The outboard cushion sheet is generally longitudinally shorter (in the front to rear direction of the vehicle) than the inboard cushion sheet so that the shorter outboard cushion sheet will restrain inward deployment of the airbag cushion. A first or rear tether and a second or front tether extend between the outboard cushion sheet and the inboard cushion sheet on opposite sides of the open mouth defined by the outboard cushion sheet. The rear tether and the front tether divide the airbag cushion into a rear airbag segment for cushioning a vehicle rear seat occupant, a central or intermediate airbag segment, and a front airbag segment for protecting a vehicle front seat occupant. Each of the tethers define at least one inflation gas passage in the tether. In stating that each of the tethers extends between the outboard cushion sheet and the inboard cushion sheet it is meant that the tether extends generally completely between the cushion sheets so as to block inflation gas flow into or out of the airbag segment in which the tether is located except for flow of inflation gas through any inflation gas passages in that tether.

According to another aspect of the present invention, the airbag cushion further includes a first or rear baffle flap and a second or front baffle flap. The rear baffle flap is secured within the rear segment adjacent the inflation gas passages of the at least one inflation gas passage defined by the rear tether so that the rear baffle flap allows inflation gas to enter the rear segment from the central segment through the at least one inflation gas passage defined by the rear tether yet prevents inflation gas from exiting the rear segment through the at least one inflation gas passage defined by the rear tether. The front baffle flap is secured within the front segment adjacent the inflation gas passages of the at least one inflation gas passage defined by the front tether so that the front baffle flap allows inflation gas to enter the front segment from the central segment through the at least one inflation gas passage defined by the front tether yet prevents inflation gas from exiting the front segment through the at least one inflation gas passage defined by the front tether. The baffle flaps, therefore, prevent inflation gas from being squeezed or transferred between the front and the rear segments.

The present invention also provides another airbag cushion for use with a side impact airbag module including an inflator. The airbag cushion includes a generally elongated outboard cushion sheet generally centrally defining an open mouth for receiving inflation gas from the inflator, and a generally elongated inboard cushion sheet having an outer periphery secured to an outer periphery of the outboard cushion sheet. A rear tether and a front tether extend between the outboard cushion sheet and the inboard cushion sheet on opposite sides of the open mouth defined by the outboard cushion sheet. The rear tether and the front tether divide the airbag cushion into a rear airbag segment for cushioning a rear seat occupant, a central segment for fluid or gas communication with an inflator, and a front airbag segment for cushioning a front seat occupant. Each of the rear and front tethers define at least one inflation gas passage.

A rear baffle flap is secured within the rear segment and is positioned to hang behind the inflation gas passages of the at least one inflation gas passage defined by the rear tether so that the rear baffle flap allows inflation gas to enter the rear segment from the central segment through the at least one inflation gas passage defined by the rear tether yet prevents inflation gas from exiting the rear segment through the at least one inflation gas passage defined by the rear tether. A front baffle flap is secured within the front segment and is positioned to hang in front of the inflation gas passages of the at least one inflation gas passage defined by the front tether so that the front baffle flap allows inflation gas to enter the front segment from the central segment through the at least one inflation gas passage defined by the front tether yet prevents inflation gas from exiting the front segment through the at least one inflation gas passage defined by the front tether. The baffle flaps, therefore, prevent inflation gas from being squeezed or transferred between the front and the rear segments.

According to one aspect of the present invention, the inboard cushion sheet is longer than the outboard cushion sheet so that the shorter outboard cushion sheet will restrain or inhibit inward deployment of the airbag cushion.

The present invention also provides airbag modules including airbag cushions as described above. Each airbag module further includes an inflator assembly having an inflator and at least one fastener for mounting the impact airbag module within a vehicle. The inflator assembly is received through the open mouth and within the central segment of the airbag cushion.

According to one aspect of the present invention, the side airbag module is for mounting in a center pillar of a vehicle. Both the rear tether and the front tether generally have a width that is no greater than and preferably less than the distance between the at least one fastener of the inflator assembly, when the side airbag module is mounted in the central pillar of the vehicle, and the side edge of the front seat of the vehicle. The front and the rear tethers, therefore, prevent the airbag cushion from striking the front seat or the vehicle occupants upon inflation, or in other words, restrain inward deployment of the airbag cushion. The inflating airbag thus forms a flattened "T" shaped cushion with the inflator attached to the central arm of the "T". During inflation of the cushion, the cushion extends inwardly to the width of the tethers, then the inflation gas from the inflator pushes the inflating front and rear airbag segments in opposing directions longitudinally along the interior side of the vehicle.

In summary, the present invention provides a side airbag module including an airbag cushion having a front airbag segment for cushioning a front seat passenger and a rear airbag segment for cushioning a rear seat passenger. The airbag cushion has tethers for preventing the airbag cushion from being deployed significantly inwardly towards the occupants, and baffle flaps for preventing inflation gas in the inflated airbag cushion from being transferred between the front and the rear segments of the airbag cushion.

According to a further aspect of this invention, the side impact airbag modules of this invention are mounted in the "B" pillar of a vehicle. Because the "B" pillar has a large internal area, the side airbag cushion of the module can be sized to cover a relatively large area of the door panels of the vehicle.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
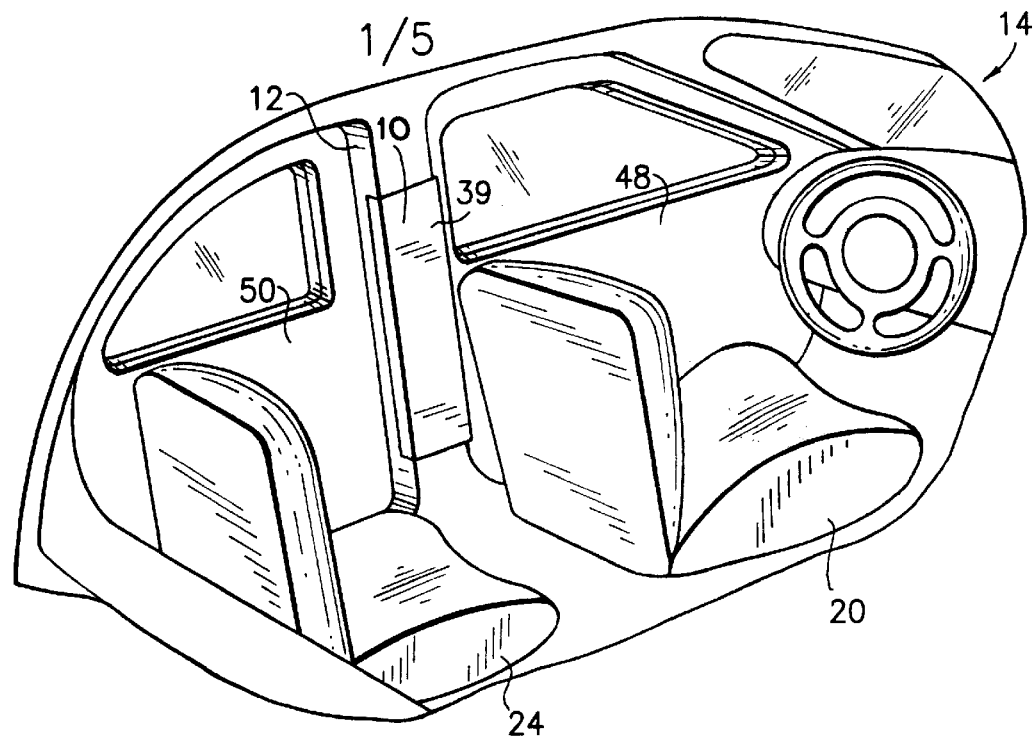
FIG. 1 is a perspective view of an automobile interior having a side airbag module according to the present invention mounted therein.
Figure 2:
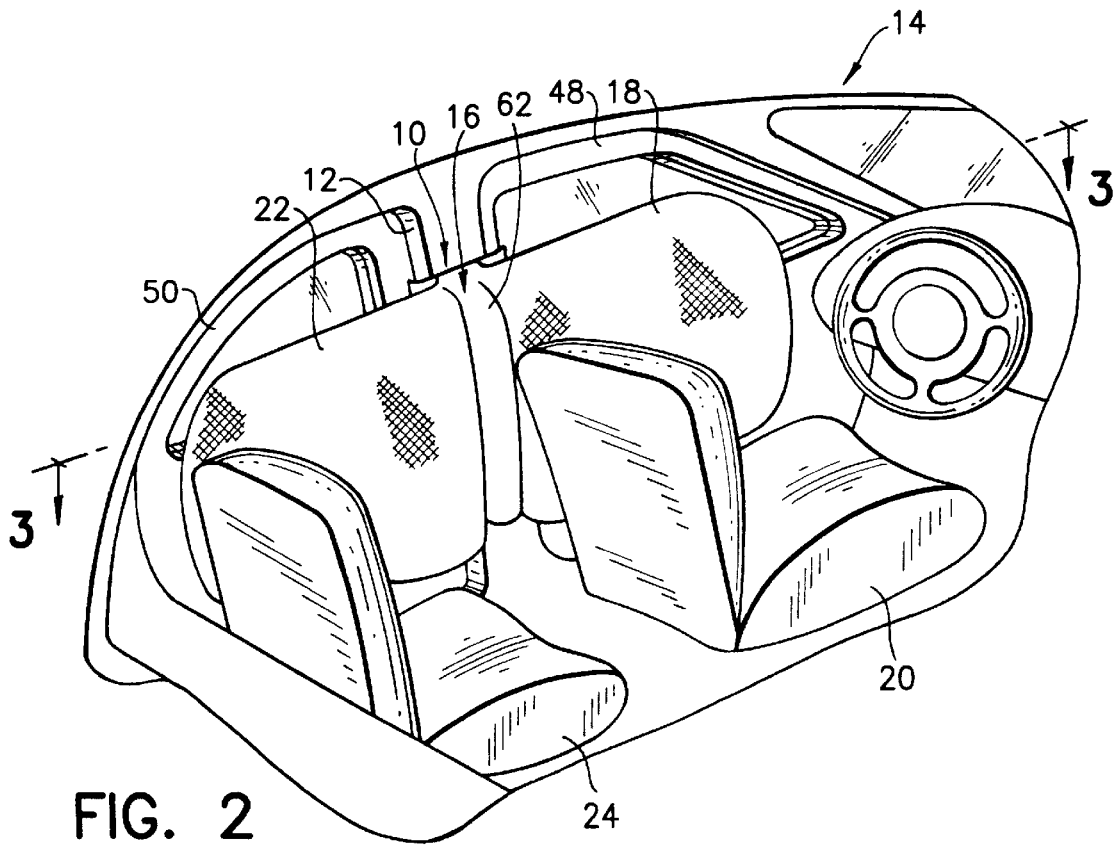
FIG. 2 is a partial perspective view of the automobile interior of FIG. 1 having an airbag cushion deployed from the side airbag module according to the present invention.
Figure 3:
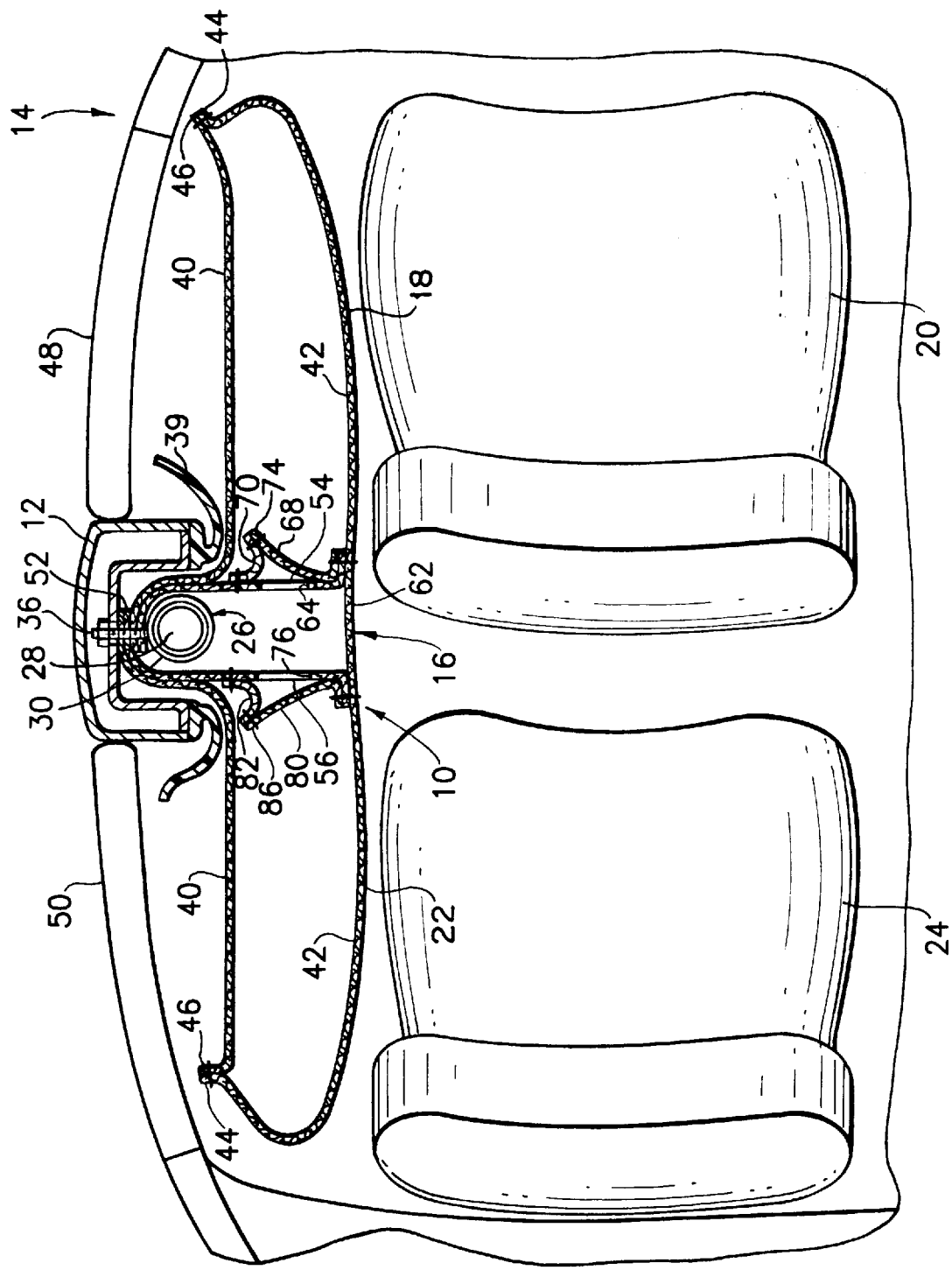
FIG. 3 is a sectional view of the side airbag module of FIG. 2 taken along the line 3—3 of FIG. 2.

Referring generally to FIGS. 1 through 4, the present invention is a side airbag module 10 adapted to mount within a central pillar 12 (or "B" pillar) of a vehicle 14, preferably an automobile. As shown in FIGS. 2 and 3, the side airbag module 10 provides the benefit of deploying a single airbag cushion 16 having a first or front segment 18 for protecting an occupant in a front seat 20 of the vehicle 14 and a second or rear segment 22 for protecting an occupant in a rear seat 24.

In addition to the airbag cushion 16, the side airbag module 10 includes an inflator assembly 26 having an elongated cylindrical inflator 28 and a tubular mounting sleeve 30. The inflator 28 provides inflation gas, which exits inflation exhaust ports 32 defined by the inflator, for inflating the airbag cushion 16 upon a signal from a remote deceleration or collision sensor. The tubular mounting sleeve 30 receives the cylindrical inflator 28 and is crimped 34 around the inflator to secure the mounting sleeve to the inflator. A plurality, generally two, fasteners 36,38 extend from the mounting sleeve 30 for mounting the side airbag module 10 within the central pillar 12 of the vehicle 14. The side airbag module 14 also includes a rupturable or movable module cover 39 enclosing the airbag cushion 16 and the inflator assembly 26 within the central pillar 12.

Figure 4:
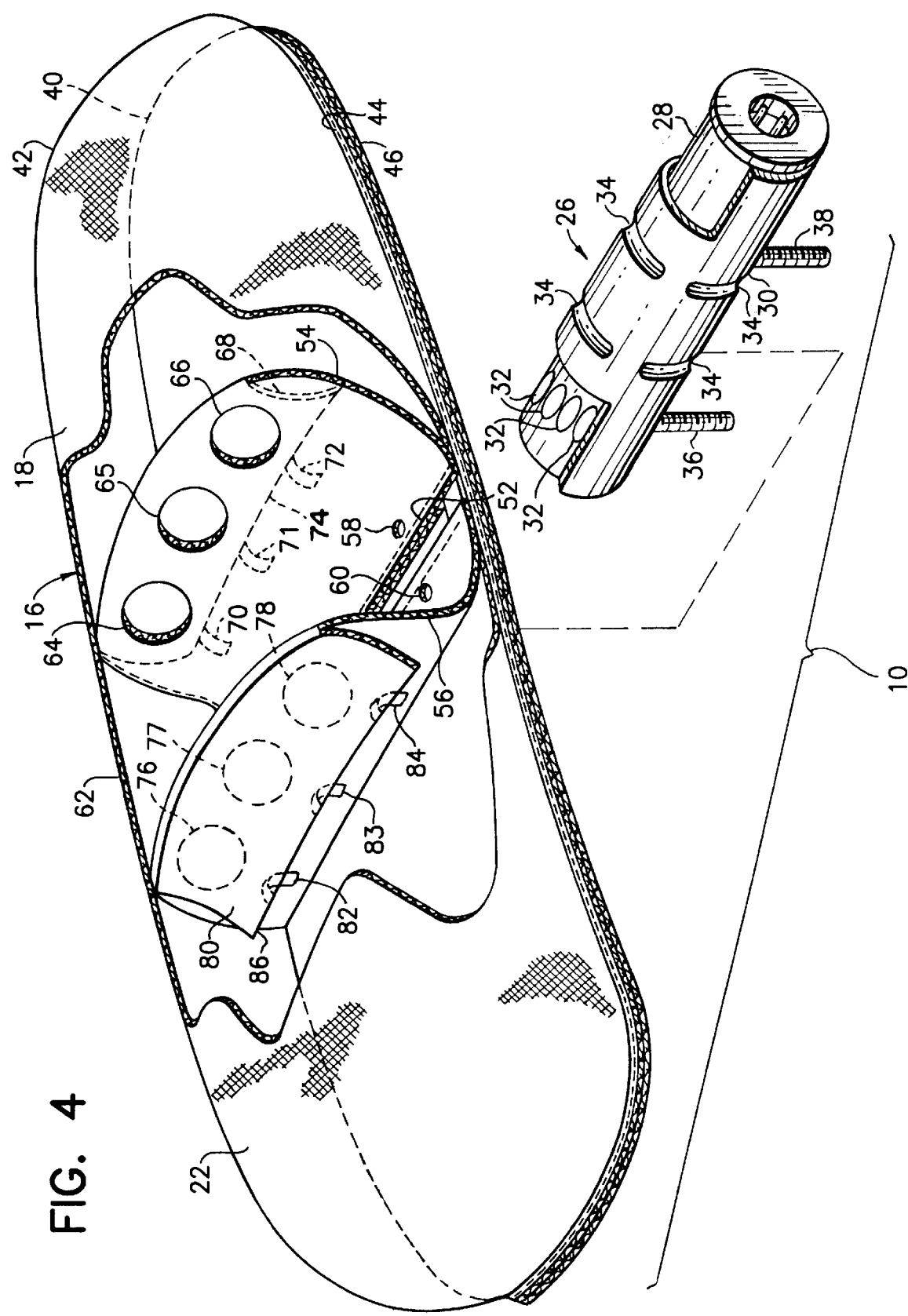
FIG. 4 is a perspective view, partially cut-away, of the side airbag module of FIGS. 1 through 3.

Referring in particular to FIGS. 3 and 4, the airbag cushion 16, which is sewn together from suitable fabric material, includes an elongated outboard cushion sheet 40 and an elongated inboard cushion sheet 42 having an outer periphery 44 secured to an outer periphery 46 of the outboard cushion sheet. Upon inflation or deployment of the airbag cushion 16, the outboard cushion sheet 40 is closest to front and rear doors 48,50 of the vehicle 14, or the side or "outboard" of the interior of the vehicle, while the inboard cushion sheet 42 is closest to the front and rear seats 20,24 of the vehicle. The outboard cushion sheet 40 has a length (with respect to extending between the front and the rear of the vehicle interior) that is shorter than the length of the inboard cushion sheet 42, and a height (with respect to extending between the ceiling and the floor of the vehicle interior) that is shorter than the height of the inboard cushion sheet so that during inflation of the airbag cushion 16 the smaller outboard cushion sheet holds the airbag cushion nearer the vehicle doors 48,50.

As best shown in FIG. 4, the outboard cushion sheet 40 defines an open mouth 52 for receiving the inflator assembly 26. The airbag cushion 16 includes a front tether 54 and a rear tether 56 extending between the outboard cushion sheet 40 and the inboard cushion sheet 42 on either side of the open mouth 52 defined by the outboard cushion sheet. The front tether 54 defines two fastener openings 58 (only one is shown) overlapping and receiving the fasteners 36,38 of the inflator assembly 26, and the rear tether 56 defines two fastener openings 60 (only one is shown) overlapping and receiving the fasteners of the inflator assembly, securing the tethers to the inflator assembly. Although not visible in the drawings, the outboard cushion sheet 40 also defines fastener openings on either side of the open mouth 52 in alignment with the fastener openings 58,60 of the tethers 54,56 and overlapping and receiving the fasteners 36,38 of the inflator assembly 26, securing the outboard cushion sheet, and therefore the airbag cushion 16, to the inflator assembly. The front and the rear tethers 54,56 divide the airbag cushion 16 into the front segment 18 for cushioning a front occupant, a central segment 62 receiving the inflator assembly 26 and the rear segment 22 for cushioning a rear occupant.

The front and the rear tethers 54,56 generally have a width (with respect to extending between the opposing sides of the vehicle interior) that is less than a distance between the fasteners 36,38 of the inflator assembly 26, when the side airbag module 10 is mounted in the central pillar 12 of the vehicle 14, and the front seat 20. The tethers 54,56 thereby restrict the deployment of the airbag cushion 16 inwardly towards the occupants, and allow the airbag cushion to inflate against the vehicle doors 48,50.

The front tether 54 defines three inflation gas passages 64,65,66 to allow inflation gas from the inflator 28 to pass from the central segment 62 of the airbag cushion 16 into the front segment 18. A front baffle flap 68 is secured within the front segment 18 and hangs over the inflation gas passages 64,65,66 defined by the front tether 54. Three spaced-apart straps 70,71,72 connect an outer edge 74 of the front baffle flap 68 to the front tether 54 to keep the front baffle flap correctly positioned in front of the three inflation gas passages 64,65,66.

The rear tether 56 defines three inflation gas passages 76,77,78 to allow inflation gas from the inflator 28 to pass from the central segment 62 of the airbag cushion 16 into the rear segment 22. A rear baffle flap 80 is secured within the rear segment 22 and hangs over the inflation gas passages 76,77,78 defined by the rear tether 56. Three spaced-apart straps 82,83,84 connect an outer edge 86 of the rear baffle flap 80 to the rear tether 56 to keep the rear baffle flap correctly positioned behind the three inflation gas passages 76,77,78.

Upon inflation of the airbag cushion 16, the front and the rear baffle flaps 68,80 are pushed away from the front and the rear tether 54,56 by entering inflation gas, allowing the inflation gas from the inflator 28 to pass from the central segment 62 of the airbag cushion, through the inflation gas passages 64,65,66,76,77, 78 of the front and the rear tethers and into the front and the rear segments 18,22. Once the front and the rear segments 18,22 are filled with inflation gas, pressure therein from inflation gas trying to exit forces the front and the rear baffle flaps 68,80 against the front and the rear tethers 54,56, blocking the inflation gas passages 64,65,66,76,77,78 and preventing inflation gas from being forced out of the front and the rear segments. The front and the rear baffle flaps 68,80, therefore, prevent the front and the rear segments 18,22 from prematurely collapsing, after being inflated, upon being struck by an occupant.

It will be understood that although FIGS. 2 through 4 shown a generally rectangular airbag cushion 16, other airbag cushion shapes may be employed within the ordinary skill of the art, such as kidney shaped front and rear airbag segments in order to obtain occupant thorax or head/thorax protection. In addition, although the vehicle 14 is shown as a four door vehicle, it will be understood that the present invention can also be used in a coupe vehicle having only front doors. Preferably, a first side airbag module 10 according to the present invention will be mounted in a driver side center pillar of a vehicle and a second side airbag module 10 according to the present invention will be mounted in a passenger side center pillar.

The present invention, therefore, provides a side airbag module 10 including an airbag cushion 16 having a front segment 18 for cushioning a front passenger and a rear segment 22 for cushioning a rear passenger. The airbag cushion 16 has tethers 54,56 for preventing the airbag cushion from being deployed inwardly towards the occupants, and baffles flaps 68,80 for preventing inflation gas in the inflated airbag cushion from being squeezed between the front and the rear segments 18,22.

It will be further appreciated that additional front or rear tethers can, if deemed desirable, be appropriately placed within the front or rear airbag segments, respectively, to assure restraint of inward deployment of the inflating airbag. These additional tethers can be of various sizes and shapes as considered desirable or necessary. Additionally, the front and rear airbag segments can be provided with appropriately sized vent holes in either or both of the inboard or outboard cushion sheets. If desired, the front and rear baffle flaps may also have inflation gas passages therethrough. However, if such inflation gas passages are present in the front and rear baffle flap, the inflation gas passages in the baffle flap are offset in location from the inflation gas passages in the adjacent tether with which the baffle flap is associated. It will also be appreciated that the tether and its associated baffle flap can be formed from a unitary piece of fabric with the tether portion being suitably attached to both the inboard and outboard cushion sheets and the baffle portion being suitably attached to only one of the inboard or outboard cushion sheets.

Figure 5:
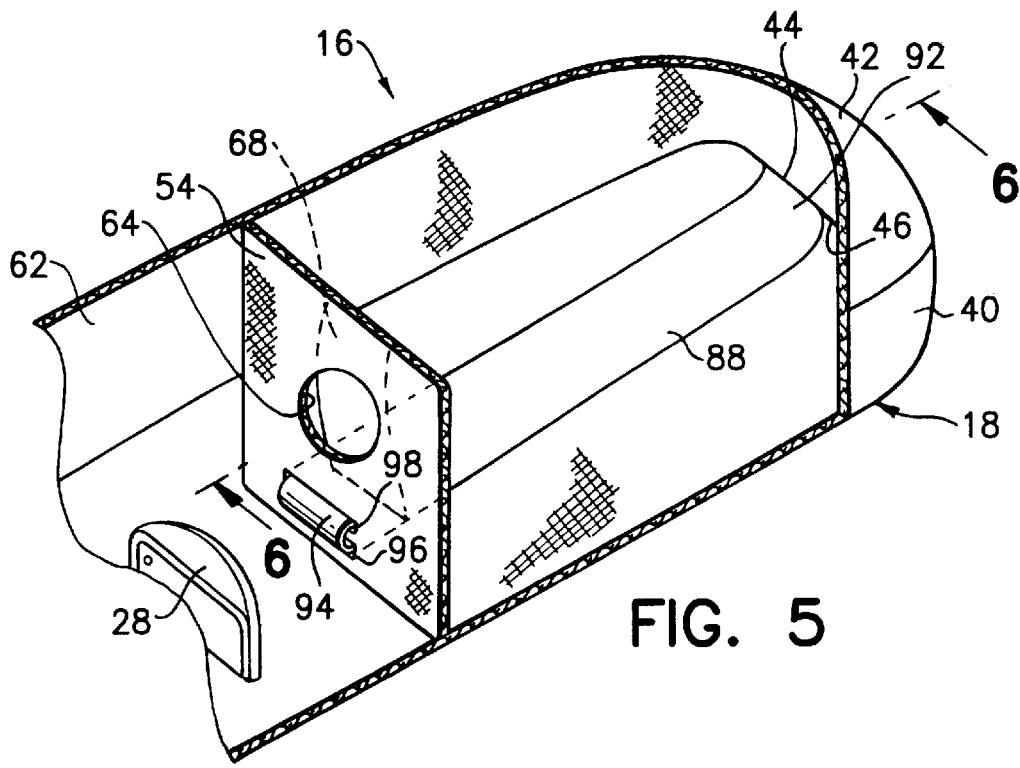
FIG. 5 is a partial perspective view of an airbag of this invention, partially cut away, to illustrate a preferred form of the baffle flap of the invention.
Figure 6:
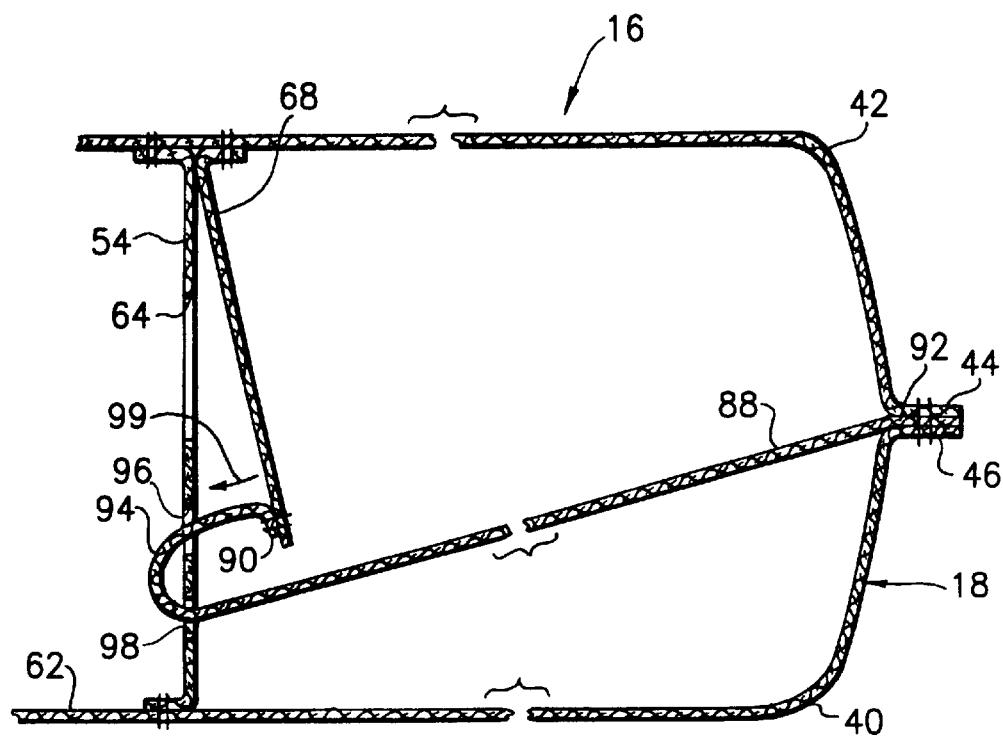
FIG. 6 is an enlarged cross-sectional view along line 6—6 of FIG. 5.

A preferred form of the invention for closing baffle flaps is illustrated in FIGS. 5 and 6. Instead of straps 70, 71, 72, 81, 82 and 83, the baffle flaps are closed upon inflation of the airbag cushion 16 by an appropriately positioned longitudinal tether arm 88 attached at a first end 90 to the baffle flap 68 and at a second, opposite end 92 to the inflatable portion of the airbag cushion 16. As illustrated, the second end is attached to the cushion between the sewn outer periphery 46 of cushion sheet 40 and the outer periphery 44 of cushion sheet 42. The portion 94 of tether arm 88 adjacent the first end 90 is looped through two spaced openings 96 and 98 provided in lateral tether 54 so that expansion of the airbag segment causes longitudinal tether 88 to be pulled or stretched longitudinally outward with the expanding airbag and thereby causing the baffle flap 68 to be pulled closed against the inflation gas passage 64 in lateral tether 54 as indicated by arrow 99. It will of course be appreciated that although the longitudinal tether arm 88 has been shown sewn between the peripheral edges 44 and 46 at the outermost point of the expanded or inflated airbag segment 18 from the central segment 62, the longitudinal tether could be attached at any convenient location in the airbag segment so long as inflation of the airbag segment causes the longitudinal tether arm to be stretched causing the baffle flap 54 to which it is attached to be drawn across and close off the inflation gas passage 64. Although this arrangement has been illustrated for only one of the baffle flaps in one airbag segment, it will be appreciated that the baffle flap in the other airbag segment may be similarly attached with such a longitudinal tether arm.

Figure 7:
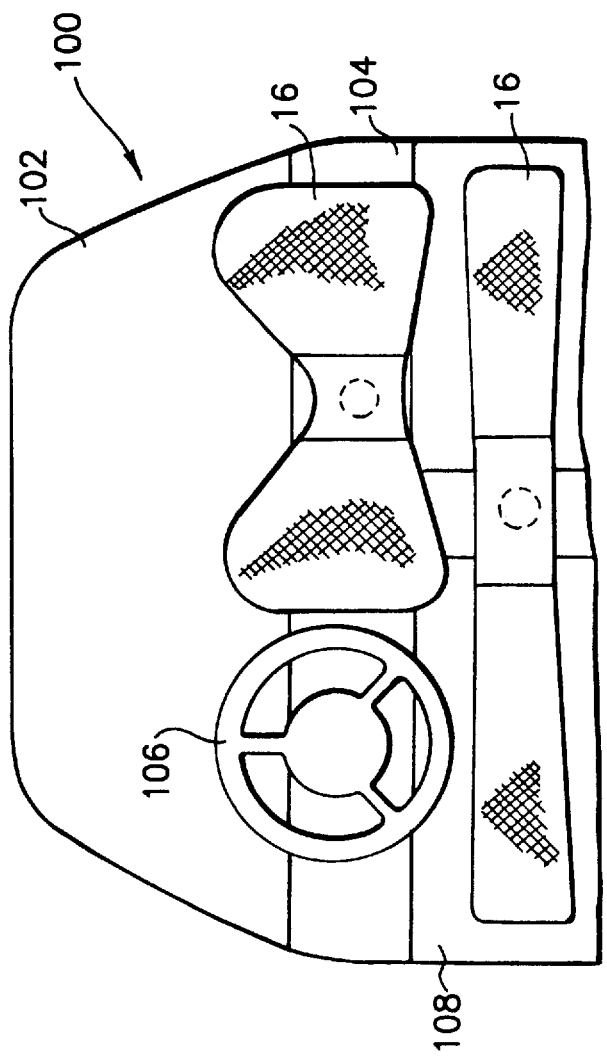
FIG. 7 is a simplified view of the front interior of a vehicle showing another location for use of an airbag according to this invention.

Although the airbag cushion of the invention has been illustrated as a side airbag cushion in a side airbag module, it will also be appreciated that such an airbag is also suitable for being placed in other locations of a vehicle and acting to protect two occupants of the vehicle. FIG. 7 is an illustration of two examples of such other placements for an airbag of this invention. FIG. 7 presents a simplified view of the interior of a front portion 100 of a motor vehicle. The front portion 100 comprises a windshield or window 102, an instrument panel or dashboard 104, a steering wheel 106 and a lower interior region 108 below the dashboard. An airbag cushion 16 of this invention is shown mounted to the instrument panel 104 for protecting the center and passenger side occupants of a vehicle front seat and also mounted in the lower interior region 108 as a knee bolster for protecting the knees of both the driver and the passenger side occupant of the vehicle.

It will be appreciated that although the airbag module and cushion therefor have been illustrated in FIG. 1 to 4 as a side airbag module and side airbag, a similarly constructed airbag module and airbag could be employed elsewhere in a vehicle to protect both first and second occupant of the vehicle. As illustrated in FIG. 7, such an airbag could be mounted in the front of a vehicle in the area of the instrument panel or dashboard to protect both center and passenger side occupants of the front seat of a vehicle, or deployed in a lower area under the instrument panel to provide knee bolster protection for both the vehicle driver and passenger.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An airbag cushion for use with an airbag module including an inflator for cushioning at least two occupants of a motor vehicle, the airbag cushion comprising:

a first generally elongated cushion sheet generally centrally defining an open mouth for receiving inflation gas from the inflator, the first cushion sheet having an outer periphery;

a second generally elongated cushion sheet having an outer periphery secured to the outer periphery of the first cushion sheet; and first and second tethers extending between the first cushion sheet and the second cushion sheet on opposite sides of and adjacent the open mouth defined by the first cushion sheet and wherein the first and second tethers divide the airbag cushion into a first airbag segment for cushioning a first occupant, a central segment comprising the open mouth for receiving inflation gas from the inflator, and a second airbag segment for cushioning a second occupant, with each of the first and second tethers defining at least one inflation gas passage therethrough.

2. An airbag cushion according to claim 1 wherein the second cushion sheet is longitudinally longer than the first cushion sheet.

3. An airbag cushion according to claim 1 further comprising:

a first baffle flap secured within the first airbag segment and located adjacent the at least one inflation gas passage defined by the first tether so that the first baffle flap allows inflation gas to enter the first airbag segment through the at least one inflation gas passage defined by the first tether yet prevents inflation gas from exiting the first airbag segment through the at least one inflation gas passage defined by the first tether; and a second baffle flap secured within the second airbag segment and located adjacent the at least one inflation gas passage defined by the second tether so that the second baffle flap allows inflation gas to enter the second airbag segment through the at least one inflation gas passage defined by the second tether yet prevents inflation gas from exiting the second airbag segment through the at least one inflation gas passage defined by the second tether.

4. An airbag cushion according to claim 3 wherein the airbag cushion is a side airbag cushion and the first airbag segment is for cushioning a rear seat occupant and the second airbag segment is for cushioning a front seat occupant.

5. An airbag cushion according to claim 3 wherein each of said first and second baffle flaps is secured to a first end of a longitudinal tether arm in the airbag segment in which the baffle flap is located and second end of each such longitudinal tether arms is secured to an expendable portion of the airbag segment in which said longitudinal tether arm is located, so that inflation and expansion of the airbag segments causes the baffle flaps to close the at least one inflation gas passage adjacent each of said first and second baffle flaps.

6. An airbag cushion according to claim 5 wherein the second end of such longitudinal tether arm is secured between the outer peripheries of the first and second elongated cushion sheets at a location furthermost from the central segment whereby inflation of the airbag cushion causes the longitudinal tether arms to pull the respective baffle flaps to which they are secured to cause said closing of the at least one inflation gas passage adjacent each of said first and second baffle flaps.

7. An airbag cushion for use with an airbag module including an inflator for cushioning at least two occupants of a motor vehicle, the airbag cushion comprising:

a first generally elongated cushion sheet defining a generally centrally located open mouth for receiving inflation gas from the inflator, the first cushion sheet having an outer periphery;

a second generally elongated cushion sheet having an outer periphery secured to the outer periphery of the first cushion sheet;

first and second tethers, each tether extending between the first cushion sheet and the second cushion sheet on opposite sides of and adjacent the open mouth defined by the first cushion sheet, the first tether and the second tether divide the airbag cushion into a first airbag segment for cushioning a first occupant, a central segment comprising the open mouth for receiving inflation gas from the inflator, and a second airbag segment for cushioning a second occupant, each of the first and second tethers defining at least one inflation gas passage therethrough;

a first baffle flap secured within the first airbag segment and adjacent the at least one inflation gas passage defined by the first tether so that the first baffle flap allows inflation gas to enter the first airbag segment through the at least one inflation gas passage defined by the first tether yet prevents inflation gas from exiting the first airbag segment through the at least one inflation gas passage defined by the first tether; and a second baffle flap secured within the second airbag segment and positioned adjacent the at least one inflation gas passage defined by the second tether so that the second baffle flap allows inflation gas to enter the second airbag segment through the at least one inflation gas passage defined by the second tether yet prevents inflation gas from exiting the second airbag segment through the at least one inflation gas passage defined by the second tether.

8. An airbag cushion according to claim 7 wherein the first cushion sheet is longitudinally shorter than the second cushion sheet and the shorter first cushion sheet and the first and second tethers act, upon inflation of the airbag cushion, to inhibit deployment of the inflating airbag cushion inwardly towards a vehicle interior in which the airbag module is located.

9. An airbag cushion according to claim 7 wherein the airbag cushion is a side airbag cushion and the first airbag segment is for cushioning a rear seat occupant and the second airbag segment is for cushioning a front seat occupant.

10. An airbag cushion according to claim 7 wherein each of said first and second baffle flaps is secured to a first end of a longitudinal tether arm in the airbag segment in which the baffle flap is located and second end of each such longitudinal tether arms is secured to an expendable portion of the airbag segment in which said longitudinal tether arm is located, so that inflation and expansion of the airbag segments causes the baffle flaps to close the at least one inflation gas passage adjacent each of said first and second baffle flaps.

11. An airbag cushion according to claim 10 wherein the second end of such longitudinal tether arm is secured between the outer peripheries of the first and second elongated cushion sheets at a location furthermost from the central segment whereby inflation of the airbag cushion causes the longitudinal tether arms to pull the respective baffle flaps to which they are secured to cause said closing of the at least one inflation gas passage adjacent each of said first and second baffle flaps.

12. An airbag module for cushioning at least two occupants of a motor vehicle, said airbag module comprising:

A) an inflator assembly including an inflator and at least one fastener for mounting the airbag module within a vehicle; and B) an airbag cushion including,
a first generally elongated cushion sheet generally centrally defining an open mouth for receiving inflation gas from the inflator, the first cushion sheet having an outer periphery;

a second generally elongated cushion sheet having an outer periphery secured to the outer periphery of the first cushion sheet;

first and second tethers extending between the first cushion sheet and the second cushion sheet on opposite sides of and adjacent the open mouth defined by the first cushion sheet and wherein the first and second tethers divide the airbag cushion into a first airbag segment for cushioning a first occupant, a central segment comprising the open mouth attached to the inflator assembly for receiving inflation gas from the inflator, and a second airbag segment for cushioning a second occupant, with each of the first and second tethers defining at least one inflation gas passage therethrough.

13. A side airbag module according to claim 12 wherein the second cushion sheet is longitudinally longer than the first cushion sheet.

14. An airbag module according to claim 12 mounted in the B pillar of a vehicle.

15. An airbag module according to claim 12 wherein the airbag cushion further comprises:

a first baffle flap secured within the first airbag segment and located adjacent the at least one inflation gas passage defined by the first tether so that the first baffle flap allows inflation gas to enter the first airbag segment through the at least one inflation gas passage defined by the first tether yet prevents inflation gas from exiting the first airbag segment through the at least one inflation gas passage defined by the first tether; and a second baffle flap secured within the second airbag and located adjacent the at least one inflation gas passage defined by the second tether so that the second baffle flap allows inflation gas to enter the second airbag segment through the at least one inflation gas passage defined by the second tether yet prevents inflation gas from exiting the second airbag segment through the at least one inflation gas passage defined by the second tether.

16. An airbag module according to claim 15 wherein the airbag cushion is a side airbag cushion and the first airbag segment is for cushioning a rear seat occupant and the second airbag segment is for cushioning a front seat occupant.

17. An airbag module according to claim 15 wherein each of said first and second baffle flaps is secured to a first end of a longitudinal tether arm in the airbag segment in which the baffle flap is located and second end of each such longitudinal tether arms is secured to an expendable portion of the airbag segment in which said longitudinal tether arm is located, so that inflation and expansion of the airbag segments causes the baffle flaps to close the at least one inflation gas passage adjacent each of said first and second baffle flaps.

18. An airbag module according to claim 17 wherein the second end of such longitudinal tether arm is secured between the outer peripheries of the first and second elongated cushion sheets at a location furthermost from the central segment whereby inflation of the airbag cushion causes the longitudinal tether arms to pull the respective baffle flaps to which they are secured to cause said closing of the at least one inflation gas passage adjacent each of said first and second baffle flaps.

19. An airbag module according to claim 16 mounted in the B pillar of a vehicle.

20. An airbag module for cushioning at least two occupants of a motor vehicle, said airbag module comprising:

A) an inflator assembly including an inflator and at least one fastener for mounting the airbag module within a vehicle; and B) an airbag cushion including,
    a first generally elongated cushion sheet defining a generally centrally located open mouth for receiving inflation gas from the inflator, the first cushion sheet having an outer periphery;
    a second generally elongated cushion sheet having an outer periphery secured to the outer periphery of the first cushion sheet;
    first and second tethers, each tether extending between the first cushion sheet and the second cushion sheet on opposite sides of and adjacent the open mouth defined by the first cushion sheet, the first tether and the second tether divide the airbag cushion into a first airbag segment for cushioning a first occupant, a central segment comprising the open mouth for receiving inflation gas from the inflator, and a second airbag segment for cushioning a second occupant, each of the first and second tethers defining at least one inflation gas passage therethrough;
    a first baffle flap secured within the first airbag segment and adjacent the at least one inflation gas passage defined by the first tether so that the first baffle flap allows inflation gas to enter the first airbag segment through the at least one inflation gas passage defined by the first tether yet prevents inflation gas from exiting the first airbag segment through the at least one inflation gas passage defined by the first tether; and
    a second baffle flap secured within the second airbag segment and positioned adjacent the at least one inflation gas passage defined by the second tether so that the second baffle flap allows inflation gas to enter the second airbag segment through the at least one inflation gas passage defined by the second tether yet prevents inflation gas from exiting the second airbag segment through the at least one inflation gas passage defined by the second tether.

21. An airbag module according to claim 20 wherein the first cushion sheet is longitudinally shorter than the second cushion sheet and the shorter first cushion sheet and the first and second tethers act, upon inflation of the airbag cushion, to inhibit deployment of the inflating airbag cushion inwardly towards the vehicle in which the airbag module is located.

22. An airbag module according to claim 20 wherein the airbag cushion is a side airbag cushion and the first airbag segment is for cushioning a rear seat occupant and the second airbag segment is for cushioning a front seat occupant.

23. An airbag module according to claim 20 wherein each of said first and second baffle flaps is secured to a first end of a longitudinal tether arm in the airbag segment in which the baffle flap is located and second end of each such longitudinal tether arms is secured to an expendable portion of the airbag segment in which said longitudinal tether arm is located, so that inflation and expansion of the airbag segments causes the baffle flaps to close the at least one inflation gas passage adjacent each of said first and second baffle flaps.

24. An airbag module according to claim 23 wherein the second end of such longitudinal tether arm is secured between the outer peripheries of the first and second elongated cushion sheets at a location furthermost from the central segment whereby inflation of the airbag cushion causes the longitudinal tether arms to pull the respective baffle flaps to which they are secured to cause said closing of the at least one inflation gas passage adjacent each of said first and second baffle flaps.

25. An airbag module according to claim 22 mounted in the B pillar of a vehicle.

* * * * *